US010781129B2

(12) United States Patent
Annamalai et al.

(10) Patent No.: US 10,781,129 B2
(45) Date of Patent: Sep. 22, 2020

(54) FUSING GLASS ARTICLES

(71) Applicant: Corning Incorporated, Corning, NY (US)

(72) Inventors: Sezhian Annamalai, Painted Post, NY (US); Kenneth Edward Hrdina, Horseheads, NY (US); Xinghua Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 263 days.

(21) Appl. No.: 15/867,933

(22) Filed: Jan. 11, 2018

(65) Prior Publication Data

US 2018/0201535 A1     Jul. 19, 2018

Related U.S. Application Data

(60) Provisional application No. 62/448,000, filed on Jan. 19, 2017.

(51) Int. Cl.
*C03B 23/203* (2006.01)
*C03B 23/24* (2006.01)
*C03C 27/06* (2006.01)

(52) U.S. Cl.
CPC ............ *C03B 23/24* (2013.01); *C03B 23/245* (2013.01); *C03C 27/06* (2013.01)

(58) Field of Classification Search
CPC ....... C03B 23/20; C03B 23/24; C03B 23/203; C03B 23/245
See application file for complete search history.

(56) References Cited

U.S. PATENT DOCUMENTS

| 2,988,852 | A | * | 6/1961 | Henry | C03B 23/20 65/34 |
| 3,728,096 | A |   | 4/1973 | Hart et al. | |
| 3,743,493 | A | * | 7/1973 | Lemelson | B22C 9/06 65/54 |
| 3,826,634 | A | * | 7/1974 | Blust et al. | C03B 23/20 65/34 |
| 5,882,465 | A | * | 3/1999 | McReynolds | B29C 65/02 156/285 |

(Continued)

FOREIGN PATENT DOCUMENTS

| CN | 103011571 A | 4/2013 |
| CN | 104261662 A | 1/2015 |
| WO | 1999555630 A1 | 11/1999 |

OTHER PUBLICATIONS

International Search Report and Written Opinion of the International Searching Authority; PCT/US2018/013793; dated Jun. 19, 2018; 16 Pages; European Patent Office.

*Primary Examiner* — Cynthia Szewczyk
(74) *Attorney, Agent, or Firm* — Robert L. Carlson

(57) ABSTRACT

A method of forming a glass article is provided. The method includes the steps of positioning a first interface surface of a first glass block proximate a second interface surface of a second glass block to define an interface seam, welding the first and second glass blocks together around a majority of the interface seam to define an internal cavity, coupling a vacuum fitting to at least one of the first and second glass blocks, drawing a vacuum in the cavity between the first and second glass blocks, and heating the first and second glass blocks to fuse the first and second glass blocks together.

21 Claims, 5 Drawing Sheets

(56) References Cited

U.S. PATENT DOCUMENTS

| | | | |
|---|---|---|---|
| 6,131,410 A * | 10/2000 | Swierkowski | C03B 23/203 |
| | | | 156/104 |
| 6,205,819 B1 * | 3/2001 | Ackler | C03B 23/203 |
| | | | 156/104 |
| 6,501,044 B1 | 12/2002 | Klockhaus et al. | |
| 6,901,772 B1 * | 6/2005 | Eberhardt | C03B 23/20 |
| | | | 65/34 |
| 8,021,755 B2 | 9/2011 | Hrdina et al. | |
| 8,148,179 B2 | 4/2012 | Aitken et al. | |
| 2004/0240817 A1 * | 12/2004 | Hawtof | C03B 37/01208 |
| | | | 385/125 |
| 2014/0083597 A1 * | 3/2014 | Kalkowski | B23K 20/24 |
| | | | 156/99 |
| 2017/0107753 A1 | 4/2017 | Koga et al. | |
| 2017/0217816 A1 * | 8/2017 | Tian | C03B 23/24 |

\* cited by examiner

FUSING GLASS ARTICLES

This application claims the benefit of priority under 35 U.S.C. § 119 of U.S. Provisional Application Ser. No. 62/448,000 filed on Jan. 19, 2017 the content of which is relied upon and incorporated herein by reference in its entirety.

FIELD

The present disclosure generally relates to methods of fusing glass articles, and more particularly, to methods of fusing glass articles using welding and vacuums.

BACKGROUND

Mirrors used in large size optics often have sizes larger than can be manufactured in a single heat of glass material. Accordingly, the large size optics often require sealing of two or more pieces of glass together in order to meet the size and shape requirements. Sealing of multiple pieces often leads to unbounded regions at the seal plane such as inclusions and the formation of gas bubbles. Additionally, the sealing process typically requires temperature where the glasses being bonded are exposed to temperatures of greater than 1700° C.

SUMMARY OF THE DISCLOSURE

According to one embodiment of the present disclosure, a method of forming a glass article is provided. The method includes the steps of positioning a first interface surface of a first glass block proximate a second interface surface of a second glass block to define an interface seam; welding the first and second glass blocks together around a majority of the interface seam to define an internal cavity; coupling a vacuum fitting to at least one of the first and second glass blocks; drawing a vacuum in the cavity between the first and second glass blocks; and heating the first and second glass blocks to fuse the first and second glass blocks together.

According to another feature of the present embodiment, a method of forming a glass article, including the steps of: positioning a first glass block proximate a second glass block to define an interface seam; welding the first and second glass blocks together around a majority of the interface seam to define an internal cavity; coupling a vacuum fitting to the interface seam; drawing a vacuum in the cavity between the first and second glass blocks; and heating the first and second glass blocks to fuse the first and second glass blocks together.

According to yet another feature of the present embodiment, a method of forming a glass article, including the steps of: positioning a first interface surface of a first glass block proximate a second interface surface of a second glass block to define an interface seam; forming a channel extending through at least one of the first and second glass blocks; welding the first and second glass blocks together around the interface seam to define a cavity; coupling a vacuum fitting to the channel; drawing a vacuum within the cavity; and heating the first and second glass blocks to fuse the first and second glass blocks together.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION OF THE PREFERRED EMBODIMENTS

Figure 1A:
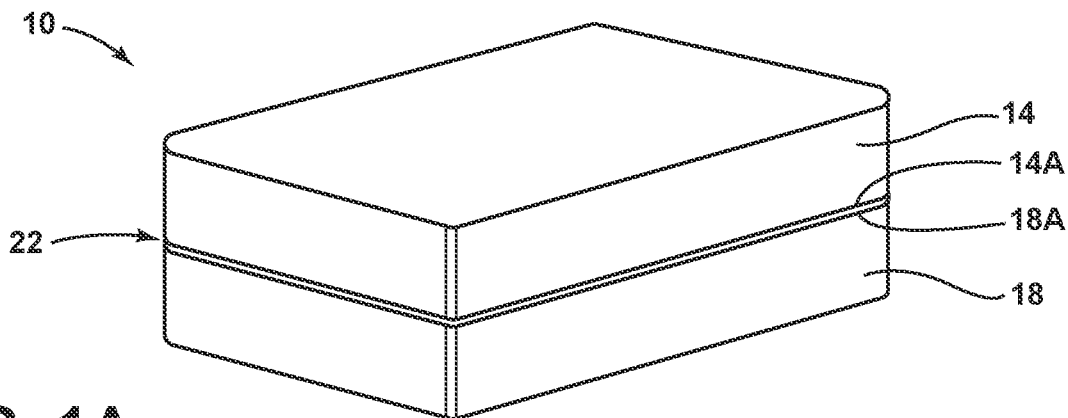
FIG. 1A is a perspective view of a glass article formed according to a method, according to one embodiment.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items. For example, if a composition is described as containing components A, B, and/or C, the composition can contain A alone; B alone; C alone; A and B in combination; A and C in combination; B and C in combination; or A, B, and C in combination.

Referring now to FIGS. 1A-4, depicted is a glass article 10 including a first glass block 14 and a second glass block 18. The first glass block 14 defines a first interface surface 14A and the second glass block 18 defines a second interface surface 18A. The first interface surface 14A is positioned proximate the second interface surface 18A to define an interface seam 22. The first and second glass blocks 14, 18 are welded together at the interface seam 22 to define an internal cavity 26 therebetween. A vacuum fitting 30 may be coupled to at least one of the first and second glass blocks 14, 18 such that a vacuum may be drawn in the cavity 26. Thereafter, the glass article 10 (e.g., the first and second glass blocks 14, 18) may be heated to fuse the first and second glass blocks 14, 18 together. The fusing of the first and second glass blocks 14, 18 may occur by fusing the first and second interface surfaces 14A, 18A to form a seal plane.

Referring now to FIG. 1, although the glass article 10 is depicted as including two glass blocks (e.g., the first and second glass blocks 14, 18), two interface surfaces (e.g., the first and second interface surfaces 14A, 18A), a single seam (e.g., the interface seam 22) and a single cavity (e.g., the internal cavity 26), it will be understood that the glass article 10 may include three or more (e.g., up to or greater than ten)

blocks, a plurality of interface surfaces between the blocks, a plurality of seams and multiple cavities. As such, it will be understood that any description related to the first and second glass blocks 14, 18, the first and second interface surfaces 14A, 18A, the interface seam 22 and/or the cavity 26 may equally be applied to related features of examples of the article 10 incorporating three or more glass blocks.

The first and second glass blocks 14, 18 may be formed of a fused silica, ultra-low expansion type glasses, glass having silica with between about 0 wt % to about 12 wt % titania, silica titania glasses with some level of titania crystals, glass ceramics and/or combinations thereof. The first and second glass blocks 14, 18 may be formed of the same material or of different materials. The first and second glass blocks 14, 18 may have the same, similar, or different coefficients of thermal expansion. The first and second glass blocks 14, 18 may have a thickness of greater than or equal to about 50 mm, 75 mm, 100 mm, 200 mm or greater than about 500 mm. The first and second glass blocks 14, 18 may have a circular, oval and/or polygon (e.g., square, rectangle, hexagon) shape. The first and second glass blocks 14, 18 may have a diameter, axis and/or longest length (e.g., length and/or width) of greater than or equal to about 0.25 m, 0.5 m, 0.75 m, 1 m, 2 m, 3 m, 4 m, 5 m, 6 m, 7 m or greater than or equal to about 8 m. The first and/or second glass blocks 14, 18 may have a weight of greater than or equal to about 1 kg, 50 kg, 100 kg, 500 kg, 900 kg or greater than or equal to about 1300 kg. At least one of the first and second glass blocks 14, 18 may have a curvature. In examples of the first and/or second glass block 14, 18 having a curvature, the curvature may be a convex or concave curvature.

The first and second blocks 14, 18 may be machined or otherwise formed to define the first and second interface surfaces 14A, 18A. The first and second interface surfaces 14A, 18A may be substantially the same in size and shape, or may be different. In examples where the first and second interface surfaces 14A, 18A are different, the first glass block 14 may be positioned proximate or on the second glass block 18 to define an overhang having a width of between about 0 mm and about 30 mm. For example, the overhang may be about 30 mm, 20 mm, 10 mm, 5 mm, 2 mm, 1.5 mm, 1.0 mm, 0.5 mm, 0.1 mm, or 0 mm. According to various examples, the overhang may be minimized. The first and/or second interface surfaces 14A, 18A, may be ground or polished and cleaned prior to positioning the first interface surface 14A onto the second interface surface 18A. The first and/or second interface surfaces 14A, 18A may be ground using a grit of greater than or equal to about 100, 200, 320, 400, 500, 600 700 or 800. The polishing may be accomplished using a polishing abrasive down to about 1 micron. Grinding or polishing of the first and/or second interface surfaces 14A, 18A may minimize a thickness of the cavity 26 between the first and second blocks 14, 18. Further, grinding and polishing of the first and/or second interface surfaces 14A, 18A may reduce the presence of contaminants proximate the seal plane (i.e., the plane where the first and second interface surfaces 14A, 18A fuse).

As explained above, the internal cavity 26 may be formed by positioning the first glass block 14 proximate, or on, the second glass block 18. In examples where the first interface surface 14A is positioned on the second interface surface 18A, the internal cavity 26 will still exist due to random, or predefined, deviations in the first and second interface surfaces 14A, 18A. It will be understood that a plurality of spacers may be positioned between the first and second interface surfaces 14A, 18A to aid in defining the cavity 26 without departing from the teachings provided herein. The cavity 26 may have a thickness, or distance between the first and second interface surfaces 14A, 18A of between about 0.1 μm and about 80 μm, or between about 1 μm and about 36 μm. The thickness of the cavity 26 may be uniform or may not be uniform across the cavity 26. In a specific example, the thickness of the cavity 26 may be greater proximate the interface seam 22 than at a center of the article 10. Minimizing the volume of the cavity 26 may reduce the amount of gas (e.g., atmospheric) trapped between the two blocks 14, 18 which will in turn reduce the chance of forming gas bubbles or unbounded regions. Gas bubbles may form between the first and second interface surfaces 14A, 18A if the amount of gas present in the cavity 26 exceeds the solubility limit of gases in the first and/or second blocks 14, 18. According to various examples, the internal cavity 26 may be flushed with a gas (e.g., hydrogen, helium, noble gases, etc.) which has a higher solubility within the first and/or second blocks 14, 18 than atmospheric gases.

After the grinding and polishing is complete, the first and/or second interface surfaces 14A, 18A may be cleaned (e.g., washed, rinsed, and/or scrubbed) in order to minimize debris within the cavity 26. The debris may be enclosed within the internal cavity 26 of the glass article 10 if not removed. Such enclosures of debris within the article 10 may discolor, weaken, devitrify or otherwise degrade the article 10 at the seal plane. Further, certain debris (e.g., organic matter) can contain material that generates highly glass insoluble gases such as CO and $CO_2$. Cleaning and/or washing may be performed with or without the use of ultrasonic or mechanical agitators. The wash may be performed using a basic washing solution having a high pH (e.g., a solution having a pH of greater than or equal to about 10, 11, 12, 13 or 14) followed by deionized water rinses. Further, the wash may be performed using an acidic washing solution having a low pH (e.g., a solution having a pH of less than or equal to about 4, 3, 2 or 1) followed by deionized water rinses. The acidic washing solution may include hydrochloric acid. The wash may further be augmented using one or more organic solvents such as toluene, isopropyl alcohol and/or combinations thereof, followed by deionized water rinses to remove organics. It will be understood that the washing and/or cleaning may be performed using the basic solution, the acidic solution, deionized water and the organic solvents in combination or separately. After washing and cleaning of the first and/or second interface surfaces 14A, 18A, the first and second glass blocks 14A, 18A may be dried and transported under laminar flow hoods or positive pressure clean room conditions (e.g., class 10,000 or better). The first and second interface surfaces 14A, 18A may then be assembled under the above noted clean room conditions. Such cleaning and clean room conditions may aid in preventing the adherence of debris to the first and second interface surfaces 14A, 18A which may reduce the presence of unbounded regions at the seal plane.

Figure 1B:
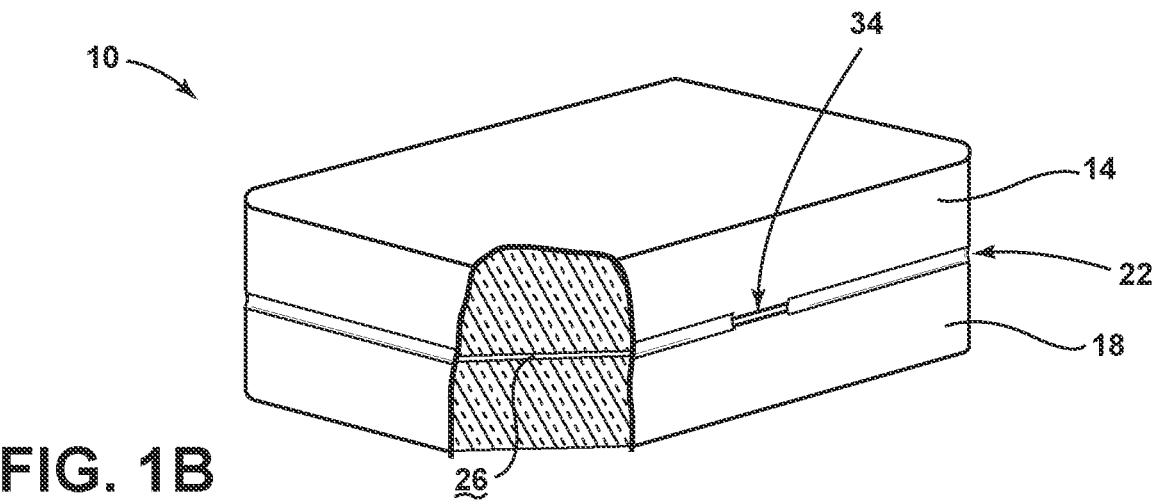
FIG. 1B is a perspective view of a welded glass article with a cut away, according to another embodiment.

Referring now to FIG. 1B, the interface seam 22 is defined around a perimeter of the glass article 10 where the first and second interface surfaces 14A, 18A meet. The interface seam 22 may be welded or fused around a portion, a majority, or the entirety of the perimeter of the glass article 10. For purposes of this disclosure, welding may mean the process of creating a hermetically sealed region (e.g., through heating and bonding) in which the joining material used (e.g., the first and second interface surfaces 14A) is the same or similar composition such that thermal expansion and thermal expansivity (e.g., expansion as function of temperature) is essentially the same. Welding may mean For example, greater than or equal to about 10%, 20%, 30%, 40%, 50%, 60%, 70%, 75%, 80%, 85%, 90%, 95%, 99%, or 100% of the interface seam 22 may be welded. The welded portion of the interface seam 22 may sufficiently fuse the first and second glass blocks 14, 18 together to form an air tight boundary between the internal cavity 26 and the environment external to the glass article 10. In some examples, the seam 22 may define an opening 34 where the seam 22 is not welded (i.e., unwelded). The opening 34 may be between about 1 mm and about 10 cm long, or between about 5 mm and about 5 cm long. In a specific example, the opening 34 may be about 1 cm long. According to various examples, the interface seam 22 may include a plurality (e.g., two or more) openings 34. In examples utilizing a plurality of openings 34, the openings 34 may be concentrated on a side or in a region of the article 10, or may be spread across the entirety of the seam 22. In other examples, the seam 22 may not define any openings 34 such that the entirety of the seam 22 is welded. In examples where the seam 22 is entirely welded, the internal cavity 26 may be air tight or hermetically sealed.

The interface seam 22 may be welded by applying localized energy to edges of the first and second glass interface surfaces 14A, 18A of the first and second glass blocks 14, 18. According to various examples, a laser may be used to fuse the first and second glass blocks 14, 18 together at the interface seam 22. In laser examples, a radio frequency excited $CO_2$ laser operating at a wavelength of 10640 nm, a repetition rate of 40 kHz and a power of 250 Watts may be used. A laser beam spot size on the interface seam 22 may be between about 1 mm and about 8 mm in diameter. In a specific example, the spot size may be about 4 mm in diameter. The laser beam may be moved along the interface seam 22 at a speed of about 0.1 mm/s. The laser beam may have a transversal wobble of about 9 mm. It will be understood that the operating characteristics of the laser may be altered from that described above without departing from the teachings provided herein. Examples where a laser is used to fuse the interface seam 22 may be advantageous in preventing the possible deposition of carbonaceous material which could then lead to formation of low glass soluble carbon containing gas species such as CO and $CO_2$ within the cavity 26. Additionally or alternatively, an oxygen/fuel source (e.g., a blow torch) can be used to fuse the first and second glass blocks 14, 18 together at the interface seam 22. For example, the oxygen/fuel source may use acetylene, $H_2$ and/or methane as a fuel source to weld the interface seam 22. Providing an excess of oxygen to the oxygen/fuel source may minimize the chance of depositing carbon containing species which may be advantageous for the above noted reasons. It will be understood that other methods of heating the interface seam 22 to the point where it welds may be used without departing from the teachings provided herein.

Figure 1C:
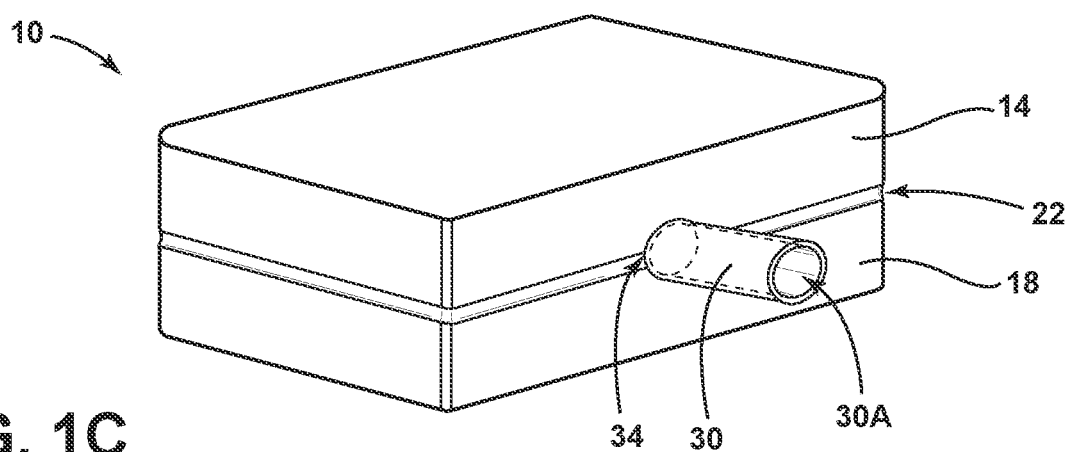
FIG. 1C is a perspective view of a welded glass article having a vacuum fitting, according to one embodiment.

Referring now to FIG. 1C, the vacuum fitting 30 defining an aperture 30A is coupled to the opening 34. Such coupling of the vacuum fitting 30 to the opening 34 results in the coupling of the vacuum fitting 30 to at least one of the first and second glass blocks 14, 18 (i.e., as to ensure a gas tight fit). As explained above, in examples where the interface seam 22 defines a plurality of openings 34, a vacuum fitting 30 may be positioned at each of the openings 34. The vacuum fittings 30 may be coupled to the openings 34 of the interface seam 22 in any of the manners described above in connection with the welding of the interface seam 22. For example, the vacuum fitting 30 may be laser fused to the first and/or second blocks 14, 18 proximate the opening 34. If no opening 34 was defined at the interface seam 22, then the aperture 30A of the fitting 30 can be machined after coupling the fitting 30 and the seam 22 such that the opening 34 and the aperture 30A are formed in a single pass. The vacuum fitting 30 may be formed of a glass, glass-ceramic, or ceramic material. In glass examples of the vacuum fitting 30, the fitting 30 may be formed of the same, or substantially the same, glass as the first and/or second glass blocks 14, 18. Examples where the vacuum fitting 30 is formed of the same glass as the first and/or second blocks 14, 18 may be advantageous in decreasing stress related to differences in thermal expansion coefficient when heating the glass article 10. The vacuum fitting 30 may define the aperture 30A therethrough which fluidly couples the opening 34 and the cavity 26 with a vacuum pump to draw a vacuum within the cavity 26 as explained in greater detail below. Flame polishing may aid in subsequent sealing between the vacuum pump and the fitting 30. Further, one or more O-rings may be used. In the depicted example, the vacuum fitting 30 is depicted as a tube, but it will be understood that the vacuum fitting 30 may take a variety of configurations (e.g., nipple, etc.).

Figure 2:
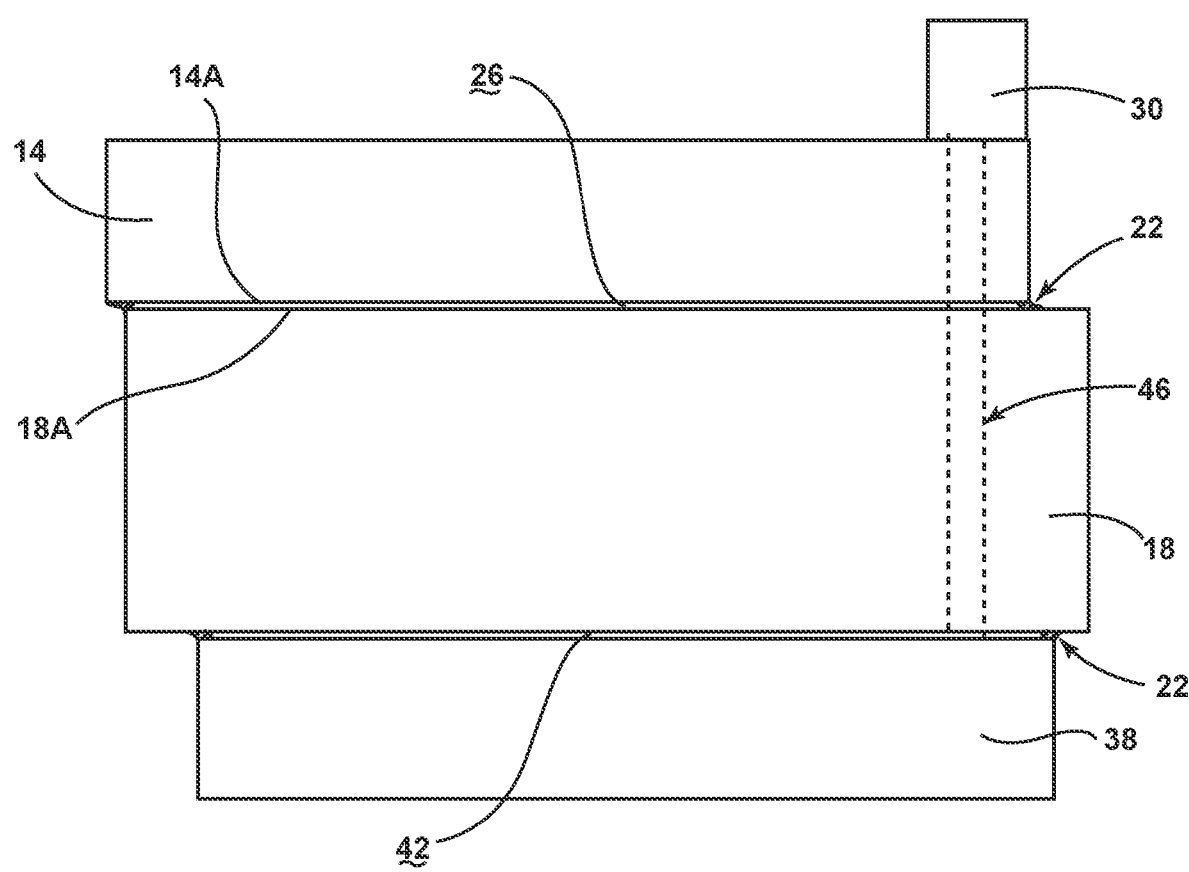
FIG. 2 is a side elevational view of a glass article, according to another embodiment.

Referring now to FIG. 2, in the depicted example, the glass article 10 includes a third glass block 38 on which the first and second glass blocks 14, 18 are positioned. The coupling of the third glass block 38 to the second glass block 38 forms a second cavity 42 and an additional interface seam 22. Additionally or alternatively to being positioned at the interface seam 22, the vacuum fitting 30 may be positioned on a face of the article 10 away from the interface seam 22. It will be understood that such positioning of the vacuum fitting 30 is equally applicable to examples of the article 10 including only the first and second glass blocks 14, 18. In examples where the vacuum fitting 30 is positioned away from the interface seam 22, a channel 46 is defined through the glass blocks 14, 18. The channel 46 is fluidly coupled with the cavity 26 and second cavity 42. The channel 46 allows a vacuum to be drawn from the single vacuum fitting 30 and gas to be evacuated from the cavity 26 and the second cavity 42. Although depicted on a top surface of the first glass block 14, it will be understood that examples of the article 10 using the channel 46 may have the vacuum fitting 30 positioned on any surface of the article 10. For example, the channel 46 may be made in a side of one or both of the glass blocks 14, 18 at an angle. The channel 46 extends through the first and second glass blocks 14, 18 and terminates at the second cavity 42. It will be understood that in examples of the article 10 having more than three blocks, the channel 46 may extend through any number of the blocks. The channel 46 may have a circular, square, star, or other polygon cross-sectional shape. The channel 46 may have a diameter or longest cross-sectional length of between about 0.1 mm and about 10 mm. The cross-sectional size and/or shape of the channel 46 may vary over the length of the channel 46 within each of the first and second blocks 14, 18, or may be different between the first and second blocks 14, 18. In the depicted example, the channel 46 is a substantially linear shape defined across the first and second glass blocks 14, 18, but in alternative examples, each section of the channel 46 may be defined in a different location. In other words, each portion of the channel 46 may not be vertically stacked. More than one channel 46 may be formed by the glass article 10. The channel 46 may be drilled, etched, and/or laser ablated from the first and second glass blocks 14, 18. The channel 46 may be formed in each of the first and second glass blocks 14, 18 prior to assembly of the article 10, or after. The first and second glass blocks 14, 18 may be cleaned after the formation of the channel 46 to remove debris.

Figure 3A:
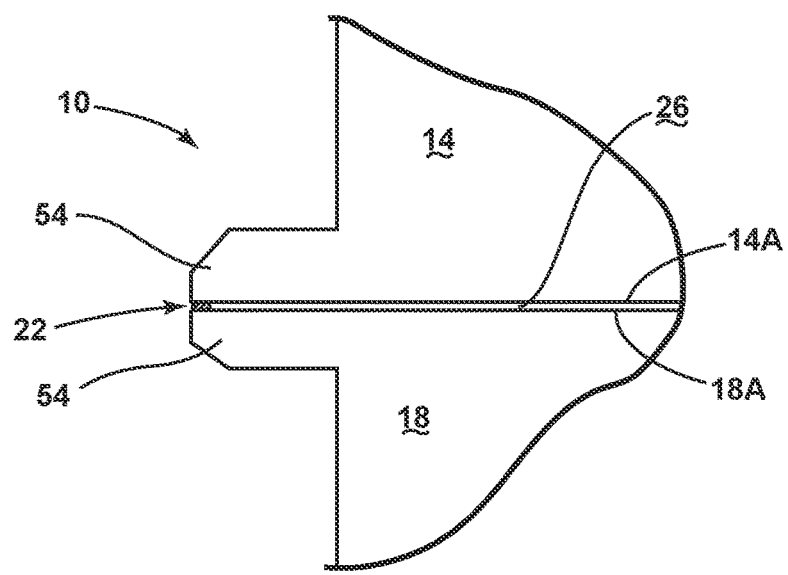
FIG. 3A is a side view of a glass article having a lip, according to one embodiment.
Figure 3B:
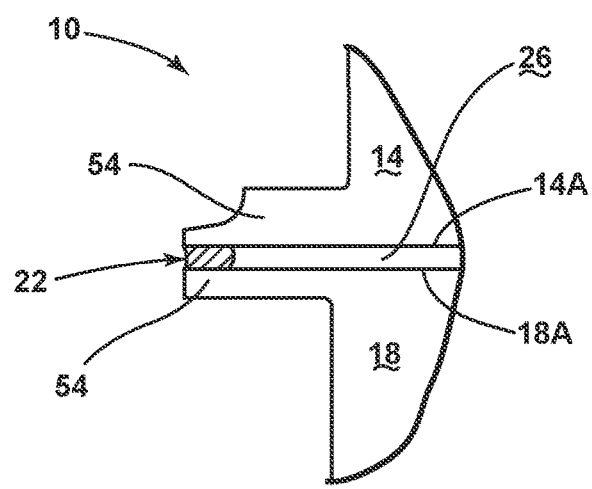
FIG. 3B is a side view of a glass article having a lip, according to another embodiment.
Figure 3C:
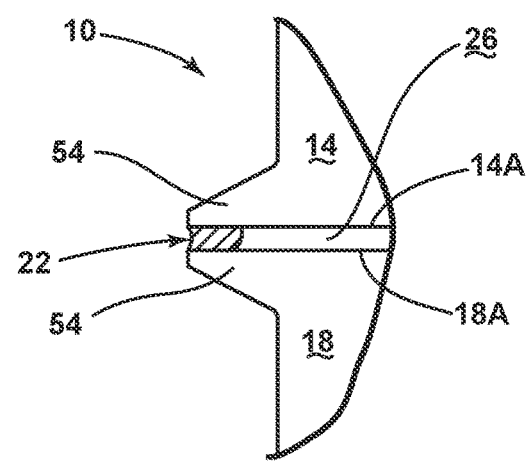
FIG. 3C is a side view of a glass article having a lip, according to yet another embodiment.

Referring now to FIGS. 3A-C, the first and second glass blocks 14, 18 may each define a lip 54 proximate the interface seam 22. The lips 54 may each be a small protrusion having a thinner cross section than each of the first and second glass blocks 14, 18. The lips 54 may be chamfered, tapered, or define other geometries which may reduce the overall heat capacity of the lips 54. During welding of the interface seam 22, the lips 54 may be melted together to seal the cavity 26. Use of the lips 54 may be advantageous in that the small nature of the lips 54 may reduce the amount of energy necessary to melt and weld the interface seam 22. In other words, because the lips 54 would melt faster than edges of the first and second glass blocks 14, 18 proximate the interface seam 22 (i.e., due to a smaller volume that the heat may dissipate into), use of the lips 54 may decrease the amount of energy used and decrease the time to seal the interface seam 22.

Figure 4:
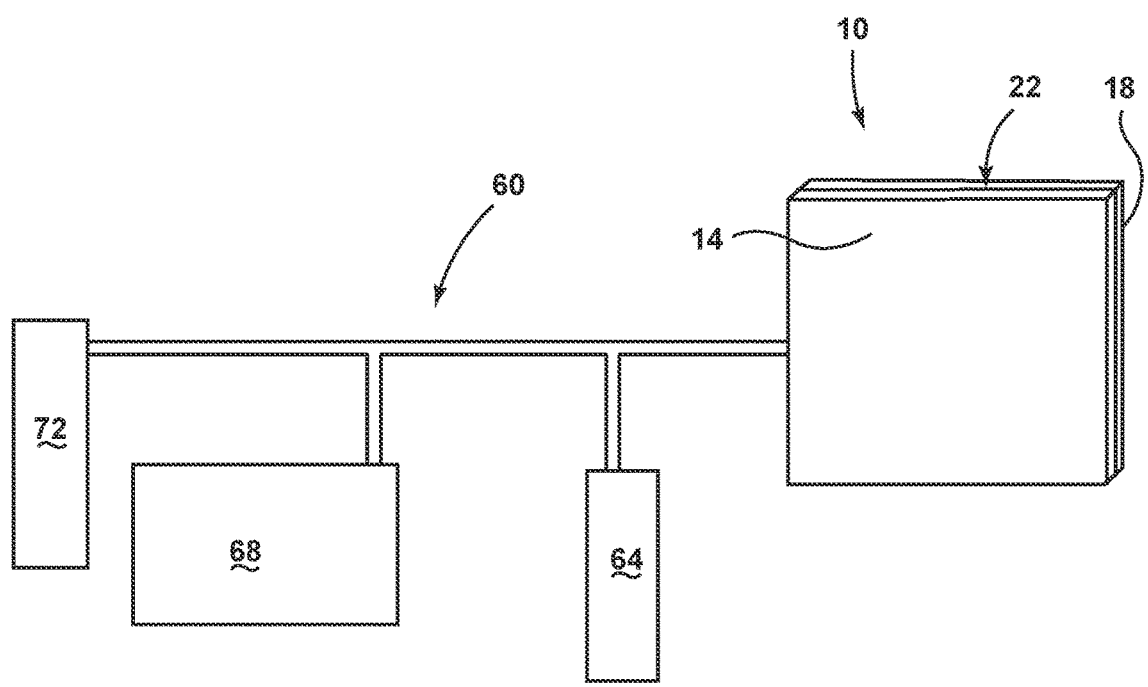
FIG. 4 is a schematic view of a vacuum system coupled to a glass article during the formation process, according to one embodiment.

Referring now to FIG. 4, after the interface seam 22 has been welded and the vacuum fitting 30 has been coupled to the article 10, the article 10 is coupled to a vacuum system 60. In the depicted example, the vacuum system 60 includes a pressure sensor 64, a vacuum pump 68 and an optional gas source 72. The vacuum pump 68 is configured to remove gases (e.g., atmospheric and/or process gases) from within the article 10 (e.g., within the cavity 26 and/or second cavity 42). As explained above, gases present within the article 10 and which have a low solubility within the glass blocks 14, 18 may lead to bubbles and other defects in the article 10. The vacuum pump 68 may draw a vacuum within the cavity 26 and/or second cavity 42 such that an absolute pressure within the cavity 26 and/or second cavity 42 is less than or equal to about 20 Torr, 10 Torr, 5 Torr, 4 Torr, 3 Torr, 2 Torr, 1 Torr, 0.1 Torr, 0.01 Torr, 0.0001 Torr, or less than or equal to about $1*10^{-5}$ Torr. The vacuum may be drawn at room temperature or at an elevated temperature. For example, the vacuum may be drawn at a temperature of greater than or equal to about 50° C., 75° C., 100° C., 125° C., 150° C., 160° C., 170° C., 180° C., 190° C., 200° C., 225° C., 250° C., 300° C. or greater than or equal to about 400° C.

The pressure sensor 64 may detect the pressure (i.e., vacuum) within the article 10. According to various examples, the pressure sensor 64 may be configured to activate and/or deactivate the vacuum pump 68 once a predetermined pressure is reached.

The gas source 72 is fluidly coupled to the article 10 and configured to supply a gas to the cavity 26 and/or second cavity 42. The gas from the gas sources 72 may be hydrogen, helium, gases having a high solubility within the material of the article 10, and/or combinations thereof. The gas from the gas source 72 may be injected, or "backfilled," into the article 10 before, during and/or after the vacuum pump 68 draws a vacuum within the cavity 26 and/or second cavity 42. The gas may be backfilled to a pressure of greater than or equal to about 50 Torr, 100 Torr, 200 Torr, 300 Torr, 400 Torr, 500 Torr, or greater than or equal to about 1000 Torr. For example, the vacuum pump 68 may draw a vacuum within the article 10, backfill the article 10 with the gas, and then re-draw the vacuum. In another example, the gas may be supplied while the vacuum is being drawn such that atmospheric gases within the article 10 are completely replaced by the gas. Flushing, backfilling and/or injecting the gas into the article 10 may act to flush atmospheric gases, which may be less soluble in the article 10 than the gas, out of the article 10. As the gas from the gas source 72 may have a high solubility in the material of the article 10, the gas will diffuse into the material of the article 10 which allows the cavity 26 and/or the second cavity 42 to maintain a high vacuum. Use of the gas source 72 may be advantageous in decreasing the amount of non-soluble gases present within the article 10, which may in turn reduce the formation of bubbles and other defects within the article 10.

The vacuum fitting 30 may be torched-off while the vacuum pump 68 is pulling a vacuum or the gas source 72 is supplying the gas. Torching off of the vacuum fitting 30 may include heating a portion of the vacuum fitting 30 such that it is both cut and sealed at the same time. By cutting and sealing the vacuum fitting 30 in this manner, the fitting 30 is sealed while still maintaining the vacuum and/or gas within the article 10. Sealing of the article 10 allows for the article 10 to be transported without compromising the vacuum or cleanliness of the cavity 26 and/or second cavity 42. It will be understood that the vacuum fitting 30 may be sealed in a variety of manners without departing from the teachings provided herein.

The article 10 is heated after the vacuum is drawn and the article 10 is sealed. The article 10 may be heated in a vacuum furnace and/or in an open air furnace. The article 10 may be heated to a temperature in the range of between about 1400° C. and about 1800° C. In specific examples, the temperature may be about 1500° C. or 1550° C. The article 10 may be heated at a rate greater than about 100° C. per hour. According to various examples, the article 10 may be heated at a rate as fast as about 10° C. per minute. The article 10 may be maintained in the furnace for a time period of about 5 minutes, 10 minutes, 20 minutes, 30 minutes, 40 minutes, 50 minutes, 1 hour, or until the first and second interface surfaces 14A, 18A have sufficiently fused together. The thermal schedule should minimize the opportunity for the first and/or second glass blocks 14, 18 to devitrify. The article 10 is heated such that the viscosity of the first and second glass blocks 14, 18 may be decreased. In other words, the article 10 is heated to a sufficient temperature to cause the first and second glass blocks 14, 18 to flow and to melt together. The article 10 should be heated to temperatures which yield viscosities less than or equal to about $10^{12}$ poise, $10^{11}$ poise, $10^{10}$ poise, $10^9$ poise or less than or equal to about $10^8$ poise. The viscosity of the article 10 may be equal to or exceed about $10^4$ poise, $10^5$ poise, $10^6$ poise or $10^7$ poise. As the viscosity of the first and second glass blocks 14, 18 decreases, the first and second interface surfaces 14A, 18A begin to contact one another at the seal plane and bond. As such, the cavity 26 may be eliminated as the first and second glass blocks 14, 18 fuse together. In other words, the first and second glass blocks 14, 18 are fused together. After fusing, the glass blocks 14, 18 may be cooled quickly to temperatures where annealing takes place.

Figure 5:
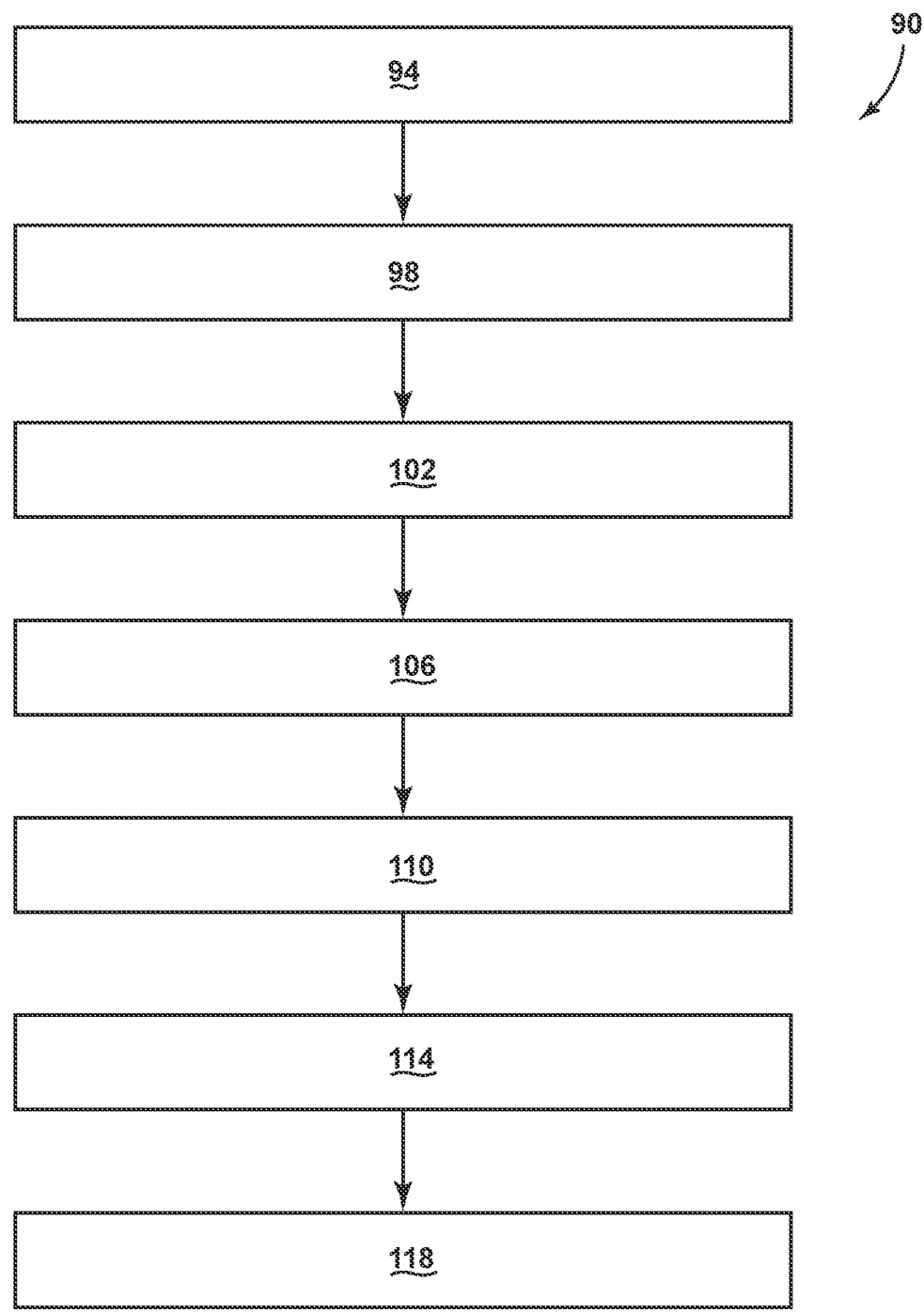
FIG. 5 is a flow diagram of a method of forming a glass article, according to one embodiment.

Referring now to FIG. 5, depicted is an exemplary method 90 of forming the glass article 10. The method 90 begins with step 94 of grinding and polishing the first and second interface surfaces 14A, 18A of the first and second glass blocks 14, 18. As explained above, the first and second interface surfaces 14A, 18A are ground and polished using a grit greater than or equal to about 200. The grinding and polishing of the first and second interface surfaces 14A, 18A may be advantageous in both removing debris as well as creating smooth surfaces which increase the chance of optimal fusing of the first and second glass blocks 14, 18. Further, grinding and polishing of the first and second interface surfaces 14A, 18A may reduce a final size of the cavity 26 such that the volume of gas that needs to be drawn out of the article 10 may be decreased and process run time may also be decreased.

Next, step 98 of cleaning the first and second glass blocks 14, 18 is performed. As explained above, the first and second interface surfaces 14A, 18A may be cleaned using a combination of basic and acidic washing solutions. The basic solution may have a pH of greater than or equal to about 10 and the acidic solution may have a pH of less than or equal to about 4. Rinses in deionized water may be performed before, during and after use of the basic and acidic solutions. Further, mechanical and ultrasonic agitators may be used in conjunction with the deionized water as well as the basic and acidic solutions. As explained above, forming the channel 46 extending through at least one of the first and second glass blocks 14, 18 may be performed before or after the cleaning of the first and second glass blocks 14, 18.

Next, step 102 of positioning the first interface surface 14A of the first glass block 14 on the second interface surface 18A of the second glass block 18 to define the interface seam 22 is performed. The first and second glass blocks 14, 18 may be positioned onto one another or slid into place. As explained above, positioning of the first glass block 14 on the second glass block 18 may result in an overhang proximate the interface seam 22 of between about 0 mm and about 30 mm.

Next, step 106 of welding the first and second glass blocks 14, 18 together around a majority of the interface seam 22 to define the internal cavity 26 is performed. As mentioned above, the welding of the interface seam 22 defines the internal cavity 26. The welded interface seam 22 prevents atmospheric gas from entering the cavity 26 as well as holds the first and second glass blocks 14, 18 together during transport. Step 106 of welding the interface seam 22 may be accomplished in a single pass, or may be performed in an intermittent pattern. Further, as explained above, the interface seam 22 may define one or more openings 34 at which the vacuum fitting 30 may be coupled.

Next, step 110 of coupling the vacuum fitting 30 to at least one of the first and second glass blocks 14, 18 is performed. In coupling the vacuum fitting 30 to the opening 34 of the interface seam 22, the vacuum fitting 30 may be coupled to one or both of the first and second glass blocks 14, 18 to ensure an air tight fit. Further, in coupling the fitting 30 to the channel 46, the fitting 30 will be coupled to at least one of the first and second glass blocks 14, 18.

Next, step 114 of drawing a vacuum in the cavity 26 between the first and second glass blocks 14, 18 is performed. As explained above, a vacuum may be drawn in the internal cavity 26 and/or the second cavity 42 such that a gas pressure within the cavity 26 may be less than about 5 Torr or less than about $10^{-5}$ Torr. During the step of drawing the vacuum, or in a separate step, the cavity 26 may be backfilled from the gas source 72 with a gas having a solubility within the first and second glass blocks 14, 18. The acts of drawing a vacuum and backfilling the cavity 26 may be repeated multiple times.

Next, step 118 of heating the first and second glass blocks 14, 18 to fuse the first and second glass blocks together is performed. As the first and second glass blocks 14, 18 are heated, the viscosity of the blocks 14, 18 decreases and the weight of the first block 14 in conjunction with the vacuum of the cavity 26 pulls, or allows the first and second interfaces 14A, 18A to make contact and fuse together. In another example, pressure may be applied to the article 10 (e.g., in the form of a weight or an isostatic gas pressure) to press the first and second interface surfaces 14A, 18A together. As the first and second interface surfaces 14A, 18A have been ground, polished and cleaned, the fusing of the first and second interface surfaces 14A, 18A in the vacuum of the cavity 26 may produce a glass article 10 having a seal plane which is substantially or completely free of inclusions, bubbles, unbounded regions and/or combinations thereof.

Use of the method of forming a glass article according to the present disclosure may offer a variety of advantages. First, the quality of the plane at which the first and second interface surfaces 14A, 18A meet may have less defects than alternate or the conventional sealing processes. Specifically, the quantity of gaseous inclusions may be greatly reduced. Additionally, a quantity of solid inclusions per unit area may be reduced as a result of (1) being able to minimize both the cavity thickness while in a controlled clean environment, (2) the ability to seal the first and second glass blocks 14, 18 together within a clean environment and (3) minimizing the time in which the first and second interface surfaces 14A, 18A are exposed. Second, the ability to lower the temperature in which the fusing of the first and second glass blocks 14, 18 may reduce the time and cost of forming the article 10. For example, typical ultra-low expansion glasses may require temperatures greater than about 1700° C., however, the present disclosure permits the first and second glass blocks 14, 18 to fuse together at lower temperatures (e.g., less than about 1600° C. or less than about 1500° C.). The lower temperatures enables sealing of first and second glass blocks 14, 18 with minimal distortion while also utilizing less specialized and cheaper process equipment. Third, use of the method according to the present disclosure may allow for the formation of near net shape articles 10 to be produced. Fourth, different types of materials of similar coefficient of thermal expansion may be assembled into a near net shape configuration. As an example, a low expansivity material which is polished poorly can be capped with material which polishes well, but may not have ideal expansivity behavior. Fifth, although described in connection with glasses and glass-ceramic materials, the disclosure may equally be applied to the joining and fusing of metal components.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims, by their language, expressly state otherwise.

What is claimed is:

1. A method of forming a glass article, comprising the steps of:
   positioning a first interface surface of a first glass block proximate a second interface surface of a second glass block to define an interface seam;
   welding the first and second glass blocks together around a majority of the interface seam to define an internal cavity;
   coupling a vacuum fitting to at least one of the first and second glass blocks;
   drawing a vacuum in the cavity between the first and second glass blocks; and
   heating the first and second glass blocks to fuse the first and second glass blocks together to allow the first and second interface surfaces to make contact and fuse together to create a seal plane.

2. The method of claim 1, wherein the step of coupling the vacuum fitting further comprises using a vacuum fitting composed of substantially the same material as one of the first and second glass blocks.

3. The method of claim 1, further comprising the steps of:
   cleaning at least one of the first and second interface surfaces with a basic solution having a pH of greater than about 10.

4. The method of claim 3, further comprising the steps of:
   cleaning at least one of the first and second interface surfaces with an acidic solution having a pH of less than about 3.

5. The method of claim 1, wherein the step of positioning the first and second glass blocks further comprises positioning the first glass block on the second glass block to define an overhang having a width of between about 0 mm and about 30 mm.

6. The method of claim 1, further comprising the step of:
   backfilling the cavity with a gas.

7. The method of claim 1, wherein the step of drawing a vacuum in the cavity further comprises drawing a vacuum in the cavity to a pressure of less than or equal to about 5 Torr.

8. The method of claim 1, wherein each of the first and second glass blocks defines a lip protruding proximate the interface seam.

9. The method of claim 1, wherein the seal plane is substantially free of inclusions, bubbles and unbounded regions.

10. A method of forming a glass article, comprising the steps of:
    positioning a first glass block proximate a second glass block to define an interface seam;
    welding the first and second glass blocks together around a majority of the interface seam to define an internal cavity;
    coupling a vacuum fitting to the interface seam;
    drawing a vacuum in the cavity between the first and second glass blocks; and
    heating the first and second glass blocks to fuse the first and second glass blocks together to allow the first and second glass blocks to make contact and fuse together to create a seal plane that is substantially free of inclusions, bubbles and unbounded regions.

11. The method of claim 10, wherein the step of drawing a vacuum in the cavity further comprises drawing a vacuum in the cavity to a pressure of less than or equal to about $10^{-5}$ Torr.

12. The method of claim 10, wherein the step of heating the first and second glass blocks further comprises heating the first and second glass blocks to a temperature in the range of about 1400° C. and about 1800° C.

13. The method of claim 10, wherein the step of heating the first and second glass blocks further comprises heating the first and second glass blocks such that the first and second glass blocks have a viscosity of less than or equal to about $10^{10}$ poise.

14. The method of claim 10, wherein the step of coupling the vacuum fitting to the interface seam is performed at an unwelded portion of the interface seam.

15. The method of claim 10, wherein at least one of the first and second glass blocks has a curvature.

16. A method of forming a glass article, comprising the steps of:
    positioning a first interface surface of a first glass block proximate a second interface surface of a second glass block to define an interface seam;
    forming a channel extending through at least one of the first and second glass blocks;
    welding the first and second glass blocks together around the interface seam to define a cavity;
    coupling a vacuum fitting to the channel;
    drawing a vacuum within the cavity; and
    heating the first and second glass blocks to fuse the first and second glass blocks together to allow the first and second interface surfaces to make contact and fuse together to create a seal plane that is substantially free of inclusions, bubbles and unbounded regions.

17. The method of claim 16, further comprising the step of:
    coupling the first and second glass block to a third glass block.

18. The method of claim 16, further comprising the step of:
    polishing at least one of the first and second interface surfaces.

19. The method of claim 16, wherein the step of heating the first and second glass blocks further comprises heating the first and second glass blocks such that the first and second glass blocks have a viscosity of less than or equal to about $10^9$ poise.

20. The method of claim 16, wherein the step of heating the first and second glass blocks further comprises heating the first and second glass blocks at a rate greater than about 100° C. per hour.

21. The method of claim 16, wherein the step of welding the first and second glass blocks together further comprises welding the entirety of the interface seam.

\* \* \* \* \*